US012764337B2

(12) United States Patent
Tsai et al.

(10) Patent No.: US 12,764,337 B2
(45) Date of Patent: Oct. 13, 2026

(54) METHOD AND APPARATUS OF CROSS-COMPONENT LINEAR MODEL PREDICTION IN VIDEO CODING SYSTEM

(71) Applicant: MEDIATEK INC., Hsinchu City (TW)

(72) Inventors: Chia-Ming Tsai, Hsinchu City (TW); Chun-Chia Chen, Hsinchu City (TW); Chih-Wei Hsu, Hsinchu City (TW); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/728,999

(22) PCT Filed: Jan. 18, 2023

(86) PCT No.: PCT/CN2023/072970
§ 371 (c)(1),
(2) Date: Jul. 15, 2024

(87) PCT Pub. No.: WO2023/138628
PCT Pub. Date: Jul. 27, 2023

(65) Prior Publication Data

US 2025/0071331 A1 Feb. 27, 2025

Related U.S. Application Data

(60) Provisional application No. 63/301,515, filed on Jan. 21, 2022, provisional application No. 63/301,518, filed on Jan. 21, 2022.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/159* (2014.11);
(Continued)

(58) Field of Classification Search
CPC .... H04N 19/70; H04N 19/105; H04N 19/159; H04N 19/176; H04N 19/186; H04N 19/196; H04N 19/33
(Continued)

(56) References Cited

U.S. PATENT DOCUMENTS 10,200,700 B2 2/2019 Zhang
11,330,298 B2 * 5/2022 Ray ........................ H04N 19/70
(Continued)

FOREIGN PATENT DOCUMENTS

CN 106664425 A 5/2017
CN 112997484 A 6/2021
(Continued)

OTHER PUBLICATIONS

International Search Report and Written Opinion dated May 8, 2023, issued in application No. PCT/CN2023/072970.
(Continued)

*Primary Examiner* — Albert Kir
(74) *Attorney, Agent, or Firm* — McClure, Qualey & Rodack, LLP

(57) ABSTRACT

A method and apparatus for video coding are disclosed. According to the method for the decoder side, a first syntax, related to whether the current block is coded in a CCLM related mode, is parsed from a bitstream comprising the encoded data for the current block. If the first syntax indicates the current block being coded in the CCLM related mode, a second syntax is parsed from the bitstream, wherein the second syntax is related to whether a multiple model CCLM mode is used or whether one or more model param-
(Continued)

eters are explicitly signalled or implicitly derived. The model parameters for the second-colour block are determined if the first syntax indicates the current block being coded in a CCLM related mode. The encoded data associated with the second-colour block is then decoded using prediction data comprising the cross-colour predictor for the second-colour block.

18 Claims, 8 Drawing Sheets

(51) Int. Cl.

| | |
|---|---|
| ***H04N 19/159*** | (2014.01) |
| ***H04N 19/176*** | (2014.01) |
| ***H04N 19/186*** | (2014.01) |
| ***H04N 19/196*** | (2014.01) |
| ***H04N 19/33*** | (2014.01) |

(52) U.S. Cl.
CPC ......... *H04N 19/176* (2014.11); *H04N 19/186* (2014.11); *H04N 19/196* (2014.11); *H04N 19/33* (2014.11)

(58) Field of Classification Search
USPC ..................................................... 375/240.12
See application file for complete search history.

(56) References Cited

U.S. PATENT DOCUMENTS

| | | | | |
|---|---|---|---|---|
| 11,930,185 | B2 | 3/2024 | Zhang | |
| 2020/0296382 | A1 | 9/2020 | Zhao | |
| 2022/0086428 | A1 | 3/2022 | Lim | |
| 2022/0385926 | A1* | 12/2022 | Deng | H04N 19/105 |
| 2025/0056017 | A1* | 2/2025 | Ghaznavi | H04N 19/147 |
| 2025/0071331 | A1* | 2/2025 | Tsai | H04N 19/70 |
| 2025/0142064 | A1* | 5/2025 | Zhang | H04N 19/80 |
| 2025/0150605 | A1* | 5/2025 | Kim | H04N 19/96 |

FOREIGN PATENT DOCUMENTS

| | | | |
|---|---|---|---|
| CN | 113273213 | A | 8/2021 |
| CN | 113853798 | A | 12/2021 |
| CN | 113892267 | A | 1/2022 |

OTHER PUBLICATIONS

Chinese language office action dated Sep. 14, 2023, issued in application No. TW 112102683.

* cited by examiner

METHOD AND APPARATUS OF CROSS-COMPONENT LINEAR MODEL PREDICTION IN VIDEO CODING SYSTEM

CROSS REFERENCE TO RELATED APPLICATIONS

The present invention is a non-Provisional Applications of and claims priority to U.S. Provisional Patent Application No. 63/301,515, filed on Jan. 21, 2022 and U.S. Provisional Patent Application No. 63/301,518, filed on Jan. 21, 2022. The U.S. Provisional Patent Applications are hereby incorporated by reference in their entireties.

FIELD OF THE INVENTION

The present invention relates to video coding system. In particular, the present invention relates to CCLM (Cross-Colour Linear Prediction) related modes in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. For example, to reduce the cross-component redundancy, a cross-component linear model (CCLM) prediction mode is used in the VVC, for which the chroma samples are predicted based on the reconstructed luma samples of the same CU by using a linear model.

While the CCLM mode can improve coding efficiency, the mode also requires to signal additional information, such as the particular CCLM mode selected for a block and the model parameters. It is desirable to develop techniques to improve the efficiency for signalling CCLM related information.

BRIEF SUMMARY OF THE INVENTION

A method and apparatus for video coding are disclosed. According to the method for the decoder side, encoded data associated with a current block comprising a first-colour block and a second-colour block are received. A first syntax is parsed from a bitstream comprising the encoded data for the current block, wherein the first syntax is related to whether the current block is coded in said one or more CCLM related modes. If the first syntax indicates the current block being coded in said one or more CCLM related modes, a second syntax is parsed from the bitstream, wherein the second syntax is related to whether a multiple model CCLM mode is used or whether one or more model parameters are explicitly signalled or implicitly derived. Said one or more model parameters for the second-colour block are determined if the first syntax indicates the current block being coded in said one or more CCLM related modes, wherein a cross-colour predictor for the second-colour block is generated by applying one or more cross-colour models to reconstructed or predicted first-colour block using said one or more model parameters. The encoded data associated with the second-colour block is then decoded using prediction data comprising the cross-colour predictor for the second-colour block.

In one embodiment, the decoding process further comprises parsing a third syntax from the bitstream if the second syntax is related to whether the multiple model CCLM mode is used, wherein the third syntax is related to whether said one or more model parameters are explicitly signalled or implicitly derived. If the third syntax indicates that said one or more model parameters are implicitly derived, an LM_LA mode using both top and left templates is selected for the current block or a further syntax is parsed to indicate a particular CCLM mode among said one or more CCLM related modes for the current block.

In one embodiment, the decoding process further comprises parsing a third syntax from the bitstream if the second syntax is related to whether the multiple model CCLM mode is used, wherein the third syntax indicates a particular CCLM mode among said one or more CCLM related modes.

In one embodiment, the decoding process further comprises parsing a third syntax from the bitstream if the second syntax indicates that said one or more model parameters are explicitly signalled, wherein the third syntax is related to whether the multiple model CCLM mode is used.

In one embodiment, if the second syntax indicates that said one or more model parameters are implicitly derived, an LM_LA mode using both top and left templates is selected for the current block or a further syntax is parsed to indicate a particular CCLM mode among said one or more CCLM related modes for the current block.

In one embodiment, the decoding process further comprises parsing, from the bitstream, a feasible range and/or a step number related to scaling parameters. For example, the feasible range and/or the step number related to the scaling parameters may be parsed in SPS (Sequence Parameter Set), PPS (Picture Parameter Set), APS (Adaptation Parameter Set), PH (Picture Header) or SH (Slice Header) of the bitstream. In one embodiment, the feasible range comprises an upper-bound and a lower-bound related to the scaling parameters, and the step number is related to a number of steps between the upper-bound and the lower-bound. Furthermore, a flag may be parsed from the PH or the SH of the bitstream to indicate whether the feasible range and the step number related to the scaling parameters in the SPS or the PPS is overwritten or not.

A corresponding method and apparatus for the encoder side are also disclosed. According to this method, pixel data associated with a current block comprising a first-colour block and a second-colour block are received. A first syntax is signalled in a bitstream comprising encoded data for the current block, wherein the first syntax is related to whether the current block is coded in said one or more CCLM related modes. One or more model parameters are determined for the second-colour block if the first syntax indicates the current block being coded in said one or more CCLM related modes, wherein a cross-colour predictor for the second-colour block is generated by applying one or more cross-colour models to reconstructed or predicted first-colour block using said one or more model parameters. A second syntax in the bitstream is signalled if the first syntax indicates the current block being coded in said one or more CCLM related modes, wherein the second syntax is related to whether a multiple model CCLM mode is used or whether said one or more model parameters are explicitly signalled or implicitly derived.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 2:
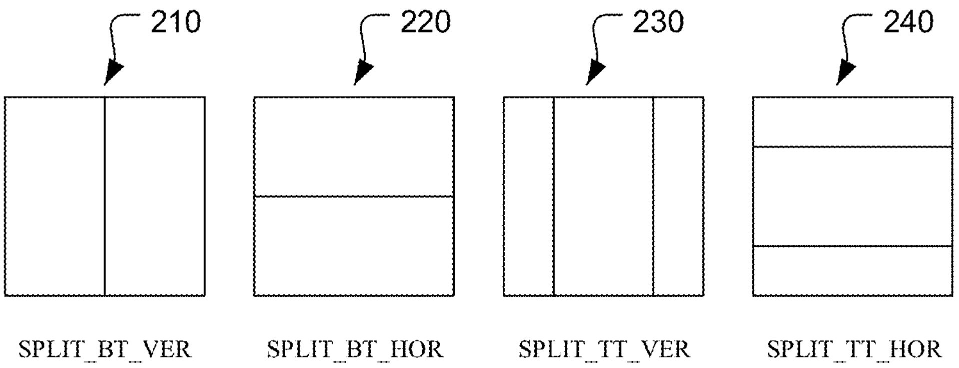
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
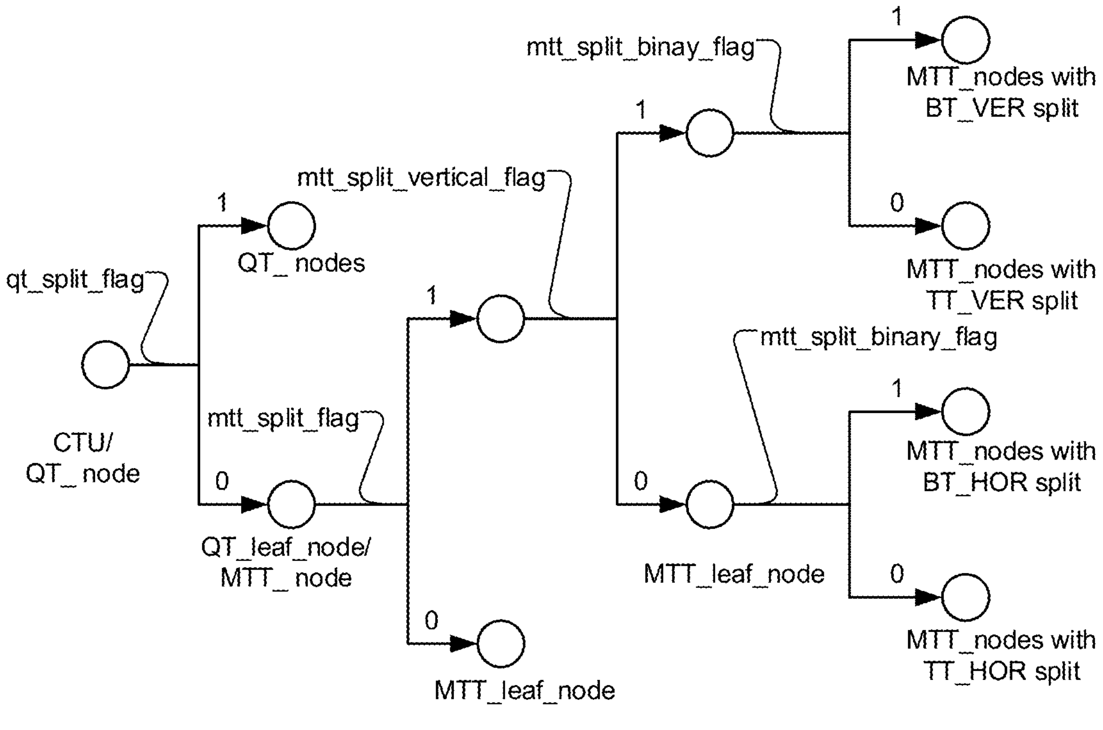
FIG. 3 illustrates an example of the signalling mechanism of the partition splitting information in quadtree with nested multi-type tree coding tree structure.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In quadtree with nested multi-type tree coding tree structure, for each CU node, a first flag (split_cu_flag) is signalled to indicate whether the node is further partitioned. If the current CU node is a quadtree CU node, a second flag (split_qt_flag) whether it's a QT partitioning or MTT partitioning mode. When a node is partitioned with MTT partitioning mode, a third flag (mtt_split_cu_vertical_flag) is signalled to indicate the splitting direction, and then a fourth flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
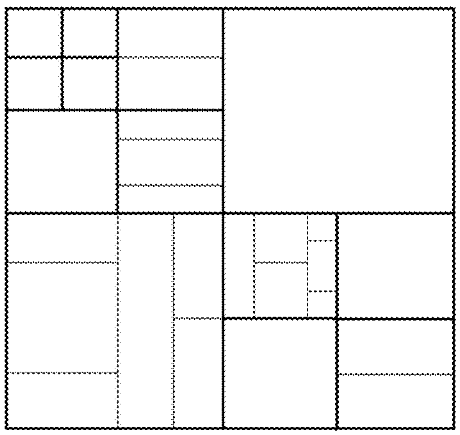
FIG. 4 shows an example of a CTU divided into multiple CUs with a quadtree and nested multi-type tree coding block structure, where the bold block edges represent quadtree partitioning and the remaining edges represent multi-type tree partitioning.

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined for the quadtree with nested multi-type tree coding tree scheme. These parameters are specified by SPS syntax elements and can be further refined by picture header syntax elements.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinCbSize: the minimum allowed coding block node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinCbsize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinCbsize, no further horizontal splitting is considered. Similarly, when the multi-type tree node has height equal to MinCbsize, no further vertical splitting is considered.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

Figure 5:
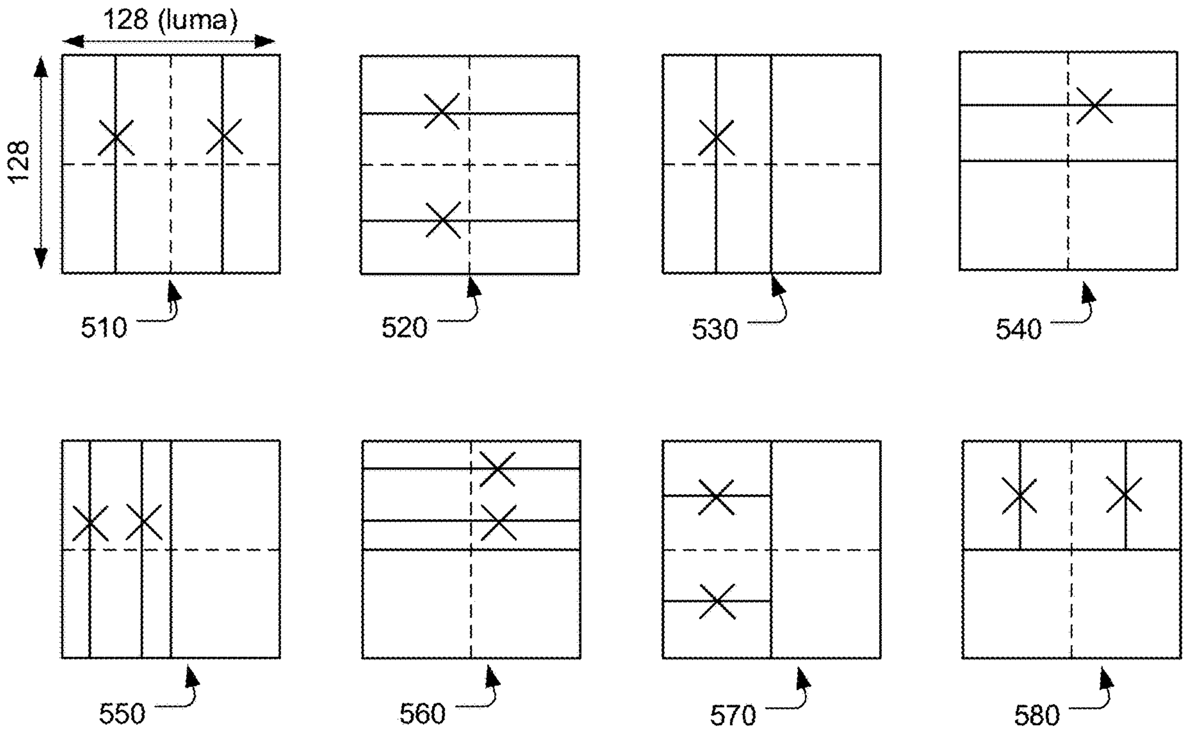
FIG. 5 shows some examples of TT split forbidden when either width or height of a luma coding block is larger than 64.

In order to keep the VPDU size as 64×64 luma samples, the following normative partition restrictions (with syntax signalling modification) are applied in VTM, as shown in FIG. 5:

TT split is not allowed (as indicated by "X" in FIG. 5) for a CU with either width or height, or both width and height equal to 128.

For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed. In FIG. 5, the luma block size is 128×128. The dashed lines indicate block size 64×64. According to the constraints mentioned above, examples of the partitions not allowed are indicated by "X" as shown in various examples (510-580) in FIG. 5.

Intra Chroma Partitioning and Prediction Restriction

In typical hardware video encoders and decoders, processing throughput drops when a picture has smaller intra blocks because of sample processing data dependency between neighbouring intra blocks. The predictor generation of an intra block requires top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed. In VVC, in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. It is required that in each SCIPU, all CBs are inter, or all CBs are non-inter, i.e., either intra or intra block copy (IBC). In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed. In addition, chroma scaling is not applied in case of a non-inter SCIPU. Here, no additional syntax is signalled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU.

For the dual tree in intra picture, the 2×N intra chroma blocks are removed by disabling vertical binary and vertical ternary splits for 4×N and 8×N chroma partitions, respectively. The small chroma blocks with sizes 2×2, 4×2, and 2×4 are also removed by partitioning restrictions.

In addition, a restriction on picture size is considered to avoid 2×2/2×4/4×2/2×N intra chroma blocks at the corner of pictures by considering the picture width and height to be multiple of max (8, MinCbSizeY).

Intra Mode Coding with 67 Intra Prediction Modes

Figure 6:
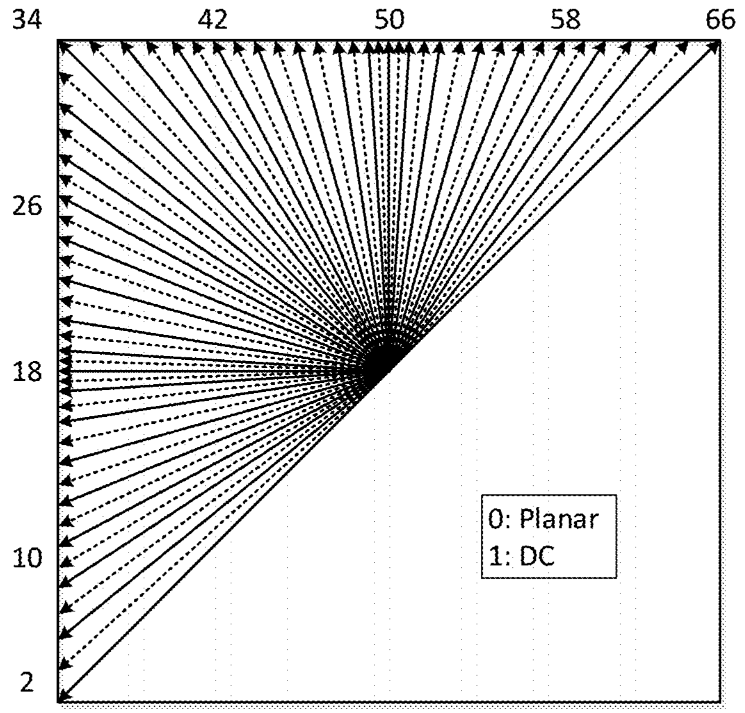
FIG. 6 shows the intra prediction modes as adopted by the VVC video coding standard.

To capture the arbitrary edge directions presented in natural video, the number of directional intra modes in VVC is extended from 33, as used in HEVC, to 65. The new directional modes not in HEVC are depicted as red dotted arrows in FIG. 6, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes

Neighbouring intra modes

Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

When a neighbouring block is not available, its intra mode is set to Planar by default.

If both modes Left and Above are non-angular modes:

MPM list→{Planar, DC, V, H, V−4, V+4}

If one of modes Left and Above is angular mode, and the other is non-angular:

Set a mode Max as the larger mode in Left and Above

MPM list→{Planar, Max, Max−1, Max+1, Max−2, M+2}

If Left and Above are both angular and they are different:

Set a mode Max as the larger mode in Left and Above

If Max−Min is equal to 1:

MPM list→{Planar, Left, Above, Min−1, Max+1, Min−2}

Otherwise, if Max−Min is greater than or equal to 62:

MPM list→{Planar, Left, Above, Min+1, Max−1, Min+2}

Otherwise, if Max−Min is equal to 2:

MPM list→{Planar, Left, Above, Min+1, Min−1, Max+1}

Otherwise:

MPM list→{Planar, Left, Above, Min−1, −Min+1, Max−1}

If Left and Above are both angular and they are the same:

MPM list→{Planar, Left, Left−1, Left+1, Left−2, Left+2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 7A:
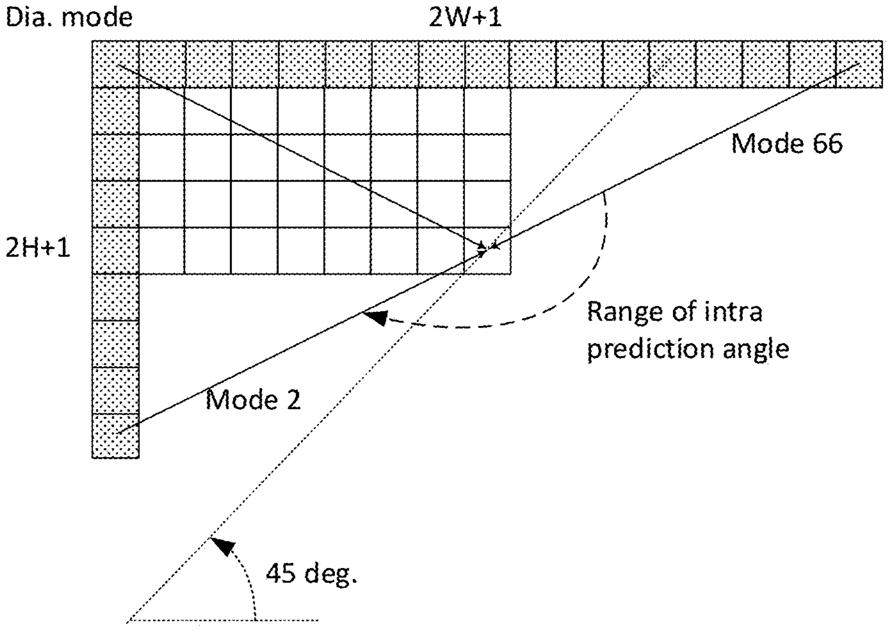
FIG. 7A-B illustrate examples of wide-angle intra prediction a block with width larger than height (FIG. 7A) and a block with height larger than width (FIG. 7B).
Figure 7B:
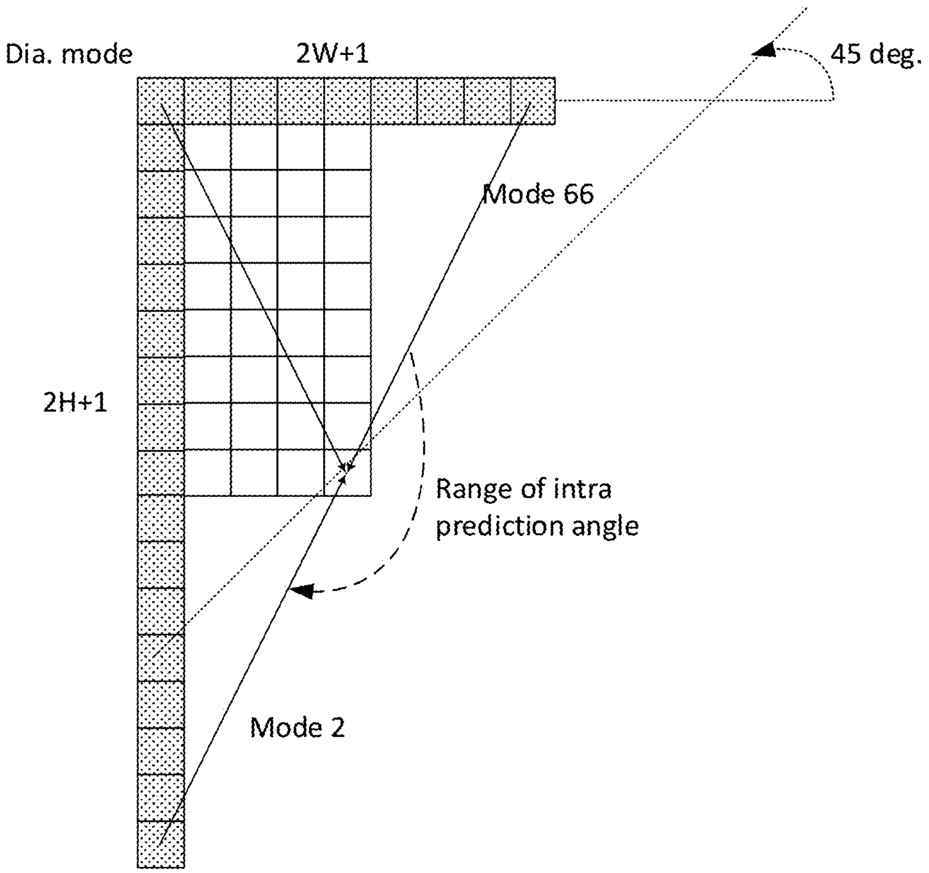

To support these prediction directions, the top reference with length 2W+1, and the left reference with length 2H+1, are defined as shown in FIG. 7A and FIG. 7B respectively.

The number of replaced modes in wide-angular direction mode depends on the aspect ratio of a block. The replaced intra prediction modes are illustrated in Table 2.

TABLE 2

Intra prediction modes replaced by wide-angular modes

| Aspect ratio | Replaced intra prediction modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| W/H = 2 | Modes 2, 3, 4, 5, 6, 7, |
| W/H = 1 | None |
| W/H = 1/2 | Modes 61, 62, 63, 64, 65, 66 |
| W/H = 1/4 | Mode 57, 58, 59, 60, 61, 62, 63, 64, 65, 66 |
| W/H = 1/8 | Modes 55, 56 |
| W/H = 1/16 | Modes 53, 54, 55, 56 |

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, j) = \alpha \cdot rec_L'(i, j) + \beta \quad (1)$$

where $pred_C(i,j)$ represents the predicted chroma samples in a CU and $rec_L'(i,j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM_LA mode is applied;

W'=W+H when LM_A mode is applied;

H'=H+W when LM_L mode is applied.

The above neighbouring positions are denoted as S[0, −1] . . . S[W'−1, −1] and the left neighbouring positions are denoted as S[−1, 0] . . . S[−1, H'−1]. Then the four samples are selected as S[W'/4,−1],S[3*W'/4,−1],S[−1,H'/4],S[−1,3*H'/4] when LM mode is applied and both above and left neighbouring samples are available;

S[W'/8,−1],S[3*W'/8,−1],S[5*W'/8,−1],S[7*W'/8,−1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$Xa = (x0A + x1A + 1) \gg 1; \quad (2)$$

-continued $$Xb=(x0B+x1B+1)\gg 1;$$

$$Ya=(y0A+y1A+1)\gg 1;$$

$$Yb=(y0B+y1B+1)\gg 1$$

Finally, the linear model parameters α and β are obtained according to the following equations.

$$\alpha=\frac{Y_a-Y_b}{X_a-X_b} \tag{3}$$

$$\beta=Y_b-\alpha\cdot X_b \tag{4}$$

Figure 8:
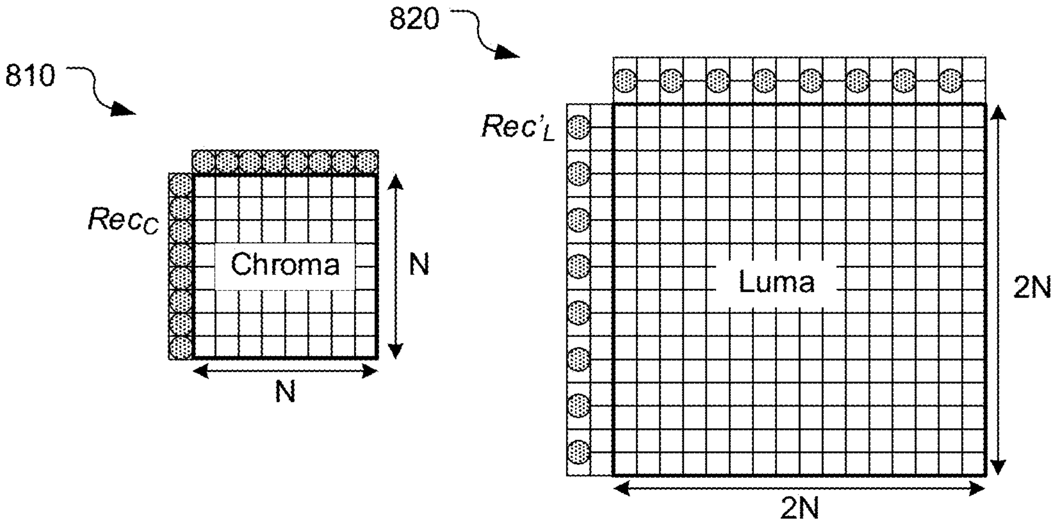
FIG. 8 shows an example of the location of the left and above samples and the sample of the current block involved in the LM_LA mode.

FIG. 8 shows an example of the location of the left and above samples and the sample of the current block involved in the LM_LA mode. FIG. 8 shows the relative sample locations of N×N chroma block 810, the corresponding 2N×2N luma block 820 and their neighbouring samples (shown as filled circles).

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

DivTable[ ]={0,7,6,5,5,4,4,3,3,2,2,1,1,1,1,0}  (5)

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H) samples. In LM_L mode, only left template are used to calculate the linear model coefficients. To get more samples, the left template is extended to (H+W) samples.

In LM_LA mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i,j)=[rec_L(2i-1,2j-1)+2\cdot rec_L(2i-1,2j-1)+rec_L(2i+1,2j-1)+rec_L(2i-1,2j)+2\cdot rec_L(2i,2j)+rec_L(2i+1,2j)+4]\gg 3 \tag{6}$$

$$Rec'_L(i,j)=rec_L(2i,2j-1)+rec_L(2i-1,2j)+4\cdot rec_L(2i,2j)+rec_L(2i+1,2j)+rec_L(2i,2j+1)+4]\gg 3 \tag{7}$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (LM_LA, LM_A, and LM_L). Chroma mode signalling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

Derivation of chroma prediction mode from luma mode when cclm_is enabled

| Chroma prediction mode | Corresponding luma intra prediction mode: 0 | 50 | 18 | 1 | X (0 <= X <= 66) |
|---|---|---|---|---|---|
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or CCLM modes (1). If it is LM mode, then the next bin indicates whether it is LM_LA (0) or not. If it is not LM_LA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 4 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular α and β are derived for a particular group). Furthermore, the samples of the current luma block are also classified based on the same rule for the classification of neighbouring luma samples.

Figure 9:
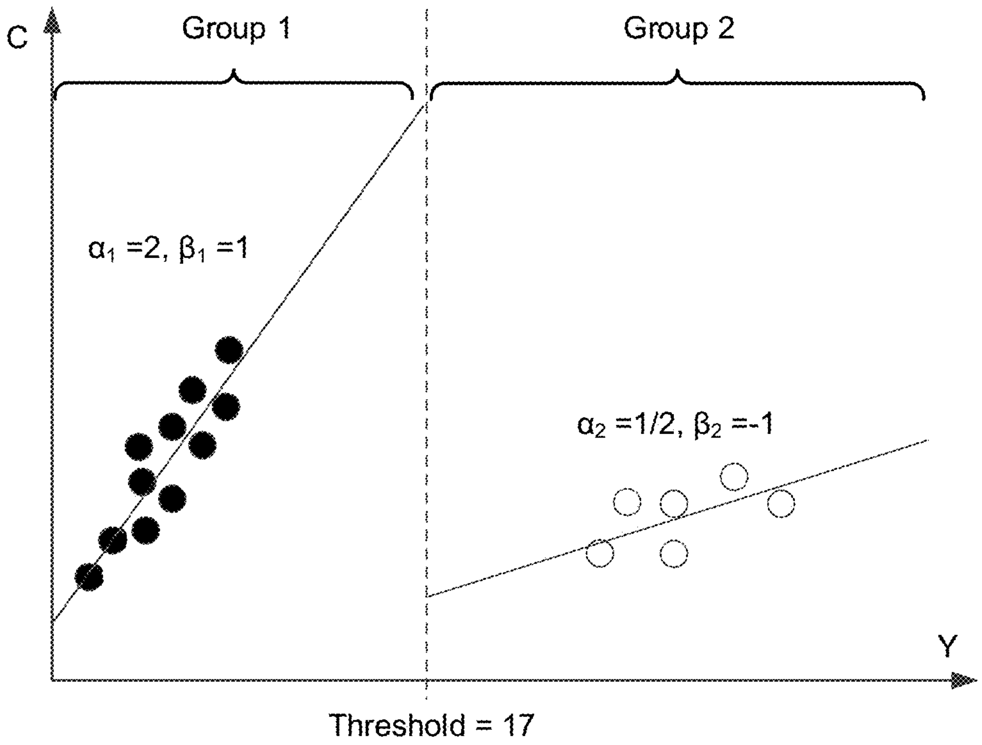
FIG. 9 shows an example of classifying the neighbouring samples into two groups according to multiple mode CCLM.

FIG. 9 shows an example of classifying the neighbouring samples into two groups. Threshold is calculated as the average value of the neighbouring reconstructed luma samples. A neighbouring sample with $Rec'_L[x,y]$<=Threshold is classified into group 1; while a neighbouring sample with $Rec'_L[x,y]$>Threshold is classified into group 2.

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases} \quad (8)$$

The following methods are proposed to improve the cross-component prediction accuracy or coding performance.

A new coding mode by explicitly signalling parameters is proposed. The linear model parameters are derived at the encoder side and signalled to the decoder side so as to relieve the decoder complexity or coding dependency. For example, the chroma prediction according to the proposed method is $pred_C(i,j)=\alpha'\cdot rec_L'(i,j)+\beta$, where α' and β are explicitly signalled in the bitstream and α' corresponds to an updated α which is implicitly derived. In one embodiment, only α' is signalled but β is implicitly derived from neighbouring (L-shape) reconstructed samples. In another embodiment, more than one set of linear model parameters are signalled to the decoder side. For example, two sets of linear model parameters in equation (8) (e.g., $\alpha_1$, $\alpha_2$, $\beta_1$, and $\beta_2$; or only $\alpha_1$ and $\alpha_2$) are signalled to decoder side. In yet another embodiment, more than one set of linear model parameters are signalled to the decoder side, but only partial model parameters are signalled, and the remaining model parameters are implicitly derived. For example, if two linear models are used for the current block, one set of linear model parameters are signalled, and another set of model parameters are implicitly derived from the neighbouring samples.

In one embodiment, if α' is signalled, β can be implicitly derived from neighbouring (L-shape) reconstructed samples. For example, in VVC, four neighbouring luma and chroma reconstructed samples can be selected to derive model parameters. Suppose the average value of the selected neighbouring luma and chroma samples are lumaAvg and chromaAvg, then β is derived as β=chromaAvg−α'·lumaAvg. The average value of neighbouring luma samples (lumaAvg) can be calculated based on all selected luma samples, the luma DC mode value of the current luma CB, or the average of the maximum and minimum luma samples (e.g., $$lumaAvg = \left(\text{Max}\left(x_A^0, x_A^1\right) + \text{Min}\left(x_B^0, x_B^1\right) + 1\right) \gg 1,$$

$$lumaAvg = \left(\text{Min}\left(x_A^0, x_A^1\right) + \text{Max}\left(x_B^0, x_B^1\right) + 1\right) \gg 1.$$

Similarly, the average value of neighbouring chroma samples (chromaAvg) can be calculated based on all selected chroma samples, the chroma DC mode value of the current chroma CB, or the average of the maximum and minimum chroma samples (e.g., $$chromaAvg = \left(\text{Max}\left(y_A^0, y_A^1\right) + \text{Min}\left(y_B^0, y_B^1\right) + 1\right) \gg 1,$$

or $$chromaAvg = \left(\text{Min}\left(y_A^0, y_A^1\right) + \text{Max}\left(y_B^0, y_B^1\right) + 1\right) \gg 1.$$

Note, for the non-4:4:4 colour subsampling format, the selected neighbouring luma reconstructed samples can be from the output of CCLM down-sampling process.

The proposed coding mode can be design as one of chroma coding modes. Possible embodiments for the mode syntax design are as follows.

Embodiment A for the Mode Syntax Design

In one embodiment, the first syntax is used to indicate whether the current chroma mode is a CCLM related mode or not. If the current chroma mode is a CCLM related mode, the second syntax is used to indicate whether multiple model CCLM mode is used or not. The CCLM related mode refers to any of the variations of the CCLM mode, such as LM_LA, LM_A, LM_L, multiple mode CCLM, etc. The third syntax is then signalled to indicate whether the CCLM parameters are implicitly or explicitly derived. If the CCLM parameters are explicitly signalled, the model parameters (e.g., the scale and offset parameters, or only the scale parameter) are further indicated. If the CCLM parameters are implicitly derived, then no further syntax is signalled and LM_LA is implicitly applied, or the CCLM prediction modes (e.g., LM_LA, LM_A, or LM_L) are further indicated. If the current chroma mode is not a CCLM related mode, then a non-CCLM mode is indicated.

Embodiment B for the Mode Syntax Design

In another embodiment, the first syntax is used to indicate whether the current chroma mode is a CCLM related mode or not. If the current chroma mode is a CCLM related mode, the second syntax is used to indicate whether the CCLM parameters are implicitly or explicitly derived. If the CCLM parameters are explicitly signalled, then the third syntax is signalled to indicate whether multiple model CCLM mode is used or not. Also, the model parameters (e.g., the scale and offset parameters, or only the scale parameter) are further indicated. If the CCLM parameters are implicitly signalled, then no further syntax is signalled and LM_LA is implicitly applied, or the CCLM prediction modes (e.g., LM_LA, LM_A, or LM_L) are further indicated. If the current chroma mode is not a CCLM related mode, then a non-CCLM mode is indicated.

Embodiment C for the Mode Syntax Design

In another embodiment, the first syntax is used to indicate whether the current chroma mode is a CCLM related mode or not. If the current chroma mode is a CCLM related mode, the second syntax is used to indicate whether multiple model CCLM mode is used or not. Also, the model parameters (e.g., the scale and offset parameters, or only the scale parameter) are further indicated. If the current chroma mode is not a CCLM related mode, then a non-CCLM mode is indicated.

Signalling of Feasible Range and Step Number of CCLM

In yet another embodiment, the feasible range and the step number of the CCLM parameters are indicated in SPS (Sequence Parameter Set), PPS (Picture Parameter Set), APS (Adaptation Parameter Set), PH (Picture Header) or SH (Slice Header). For example, the feasible range and steps of scaling parameters are signalled in SPS, PPS, APS, PH or SH, which indicates the upper-bound of scaling parameter, the lower-bound of scaling parameter, the number of steps between the upper-bound and lower-bound of scaling parameter. For example, the signalled upper-bound of scaling parameter is $\alpha'_{max}$, the signalled lower-bound of scaling parameter is $\alpha'_{min}$, the signalled number of steps is n. Then, the scaling parameter of the current block coded with the proposed coding mode could be one of $\{(\alpha'_{min}+(\alpha'_{max}-\alpha'_{min})\times 0/n), (\alpha'_{min}+(\alpha'_{max}-\alpha'_{min})\times 1/n), (\alpha'_{min}+(\alpha'_{max}-\alpha'_{min})\times 2/n), \ldots, (\alpha'_{min}+(\alpha'_{max}-\alpha'_{min})\times (k-1)/n), (\alpha'_{min}+(\alpha'_{max}-\alpha'_{min})\times k/n)\}$, where $0<k\leq n$. If the proposed coding mode is selected, then a syntax is used to indicate the index of the selected scaling parameter. In another embodiment, if the feasible range and steps of scaling parameters are signalled in SPS or PPS, a flag is signalled in PH or SH to indicate if the feasible range and steps of scaling parameters in SPS or PPS is overwritten or not. If the feasible range and steps of scaling parameters in SPS or PPS is overwritten, it can further indicate another feasible range and steps of scaling parameters in PH or SH for the corresponding picture or slice. Similarly, if the offset parameter is signalled, the offset parameter can also apply the same approach.

For still another embodiment, the feasible CCLM parameters can be indicated in table(s). When signalling the scale parameter or the offset parameter, the index of the corresponding table is signalled. The table could be predefined at encoder side and decoder side.

Figure 10:
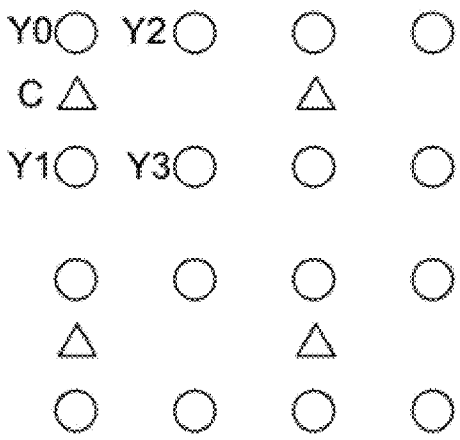
FIG. 10 shows an example of various luma sample phases to derive the model parameters, where the circle positions are the integer luma sample phase positions, and the triangle positions are the chroma sampling phase positions.

When the encoder side is deriving the scaling parameter or offset parameter, it can use the current luma reconstruction samples and the current source chroma samples to derive the model parameters and signalled in bitstream. In one embodiment, if the scaling parameter is indicated by signalling the index of candidate scaling values, the final best scaling parameter is chosen by the rate-distortion optimization (RDO) comparisons between these candidates. Similarly, if the offset parameter is indicated by signalling the index of candidate offset values, the final best offset parameter is chosen by the rate-distortion optimization (RDO) comparisons between these candidates. In another embodiment, it can try various luma sample phases to derive the model parameters. As shown in FIG. 10, the circle positions are the integer luma sample phase positions, and the triangle positions are the chroma sampling phase positions. The candidates can use the reconstructed chroma samples and the corresponding reconstructed luma samples from the luma phase positions at Y0, Y1, Y2, Y3, or combine multiple luma phases (e.g., (Y0+Y2+1)>>1, (Y0+Y3+1)>>1, (Y1+Y2+1)>>1, (Y1+Y3+1)>>1, (Y2+Y3+1)>>1, or (Y0+Y1+Y2+Y3+2)>>2) to derive the model parameters. The final best model parameters are signalled based on the rate-distortion optimization (RDO) comparisons among these candidates (i.e., RDO comparisons between the corresponding luma sample associated with each chroma sample corresponds to Y0, Y1, Y2, Y3, (Y0+Y1+1)>>1, (Y0+Y2+1)>>1, (Y0+Y3+1)>>1, (Y1+Y2+1)>>1, (Y1+Y3+1)>>1, (Y2+Y3+1)>>1, or (Y0+Y1+Y2+Y3+2)>>2, where the corresponding luma sample may refer to the reconstructed luma samples and the chroma sample may refer to the reconstructed chroma samples).

Figure 1A:
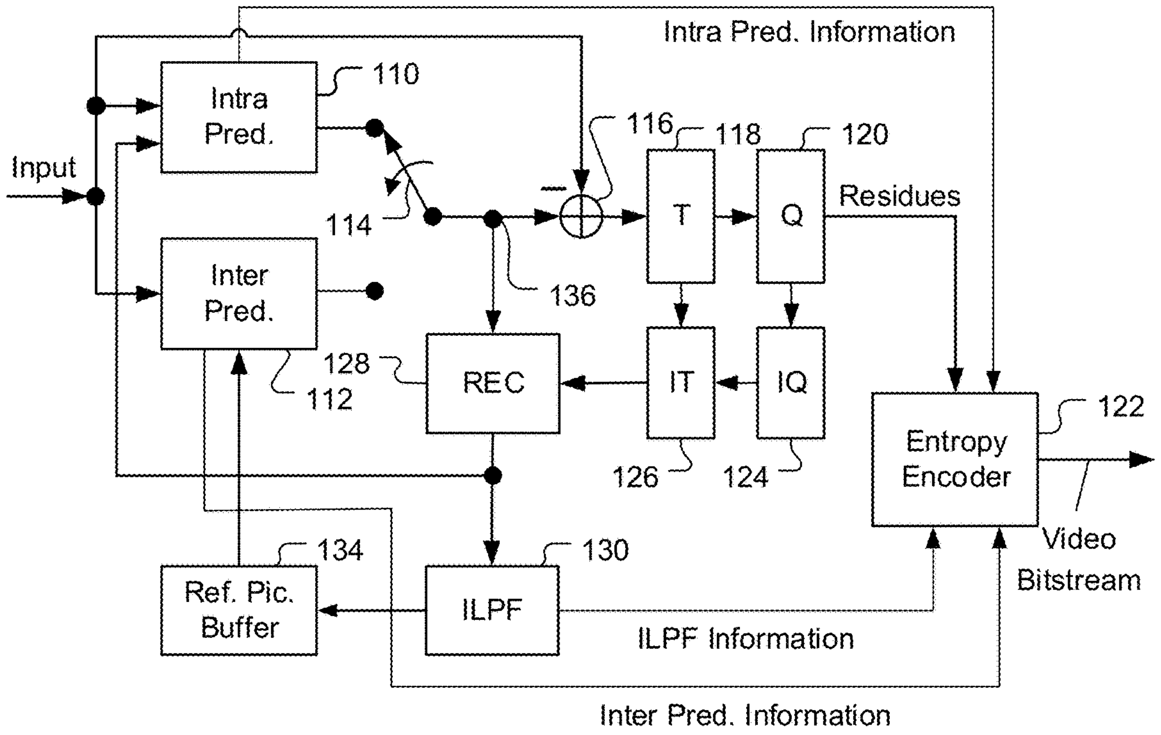
FIG. 1A illustrates an exemplary adaptive Inter/Intra video coding system incorporating loop processing.
Figure 1B:
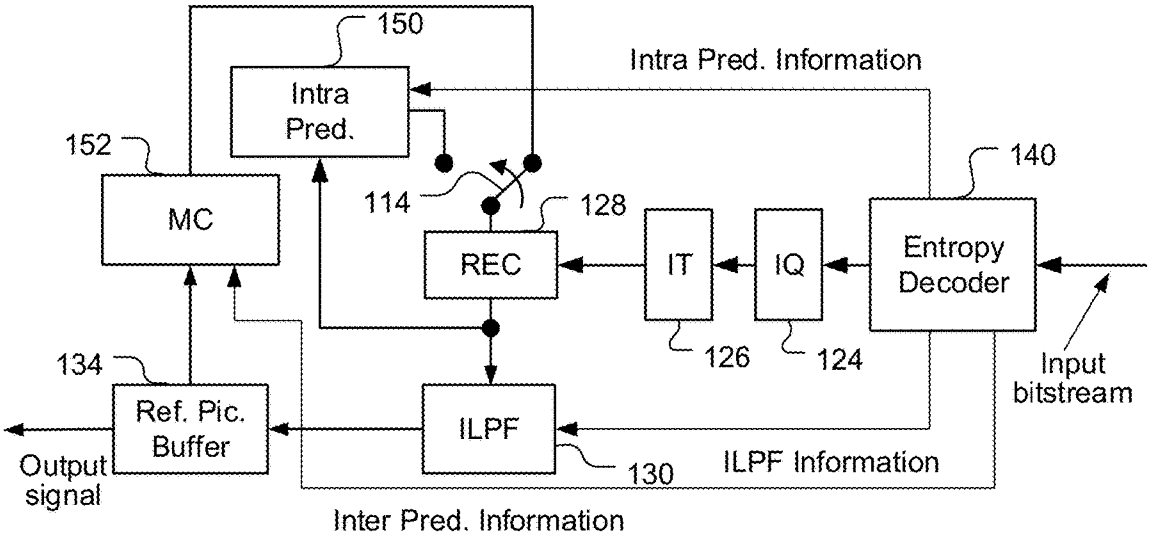
FIG. 1B illustrates a corresponding decoder for the encoder in FIG. 1A.

The CCLM (Cross Colour Linear Model) as described above can be implemented in an encoder side or a decoder side. For example, any of the proposed CCLM methods can be implemented in an Intra coding module (e.g. Intra pred. 150 in FIG. 1B) in a decoder or an Intra coding module is an encoder (e.g. Intra Pred. 110 in FIG. 1A). Any of the proposed CCLM methods can also be implemented as a circuit coupled to the intra coding module at the decoder or the encoder. However, the decoder or encoder may also use additional processing unit to implement the required CCLM processing. While the Intra Pred. units (110 in FIG. 1A and MC 150 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 11:
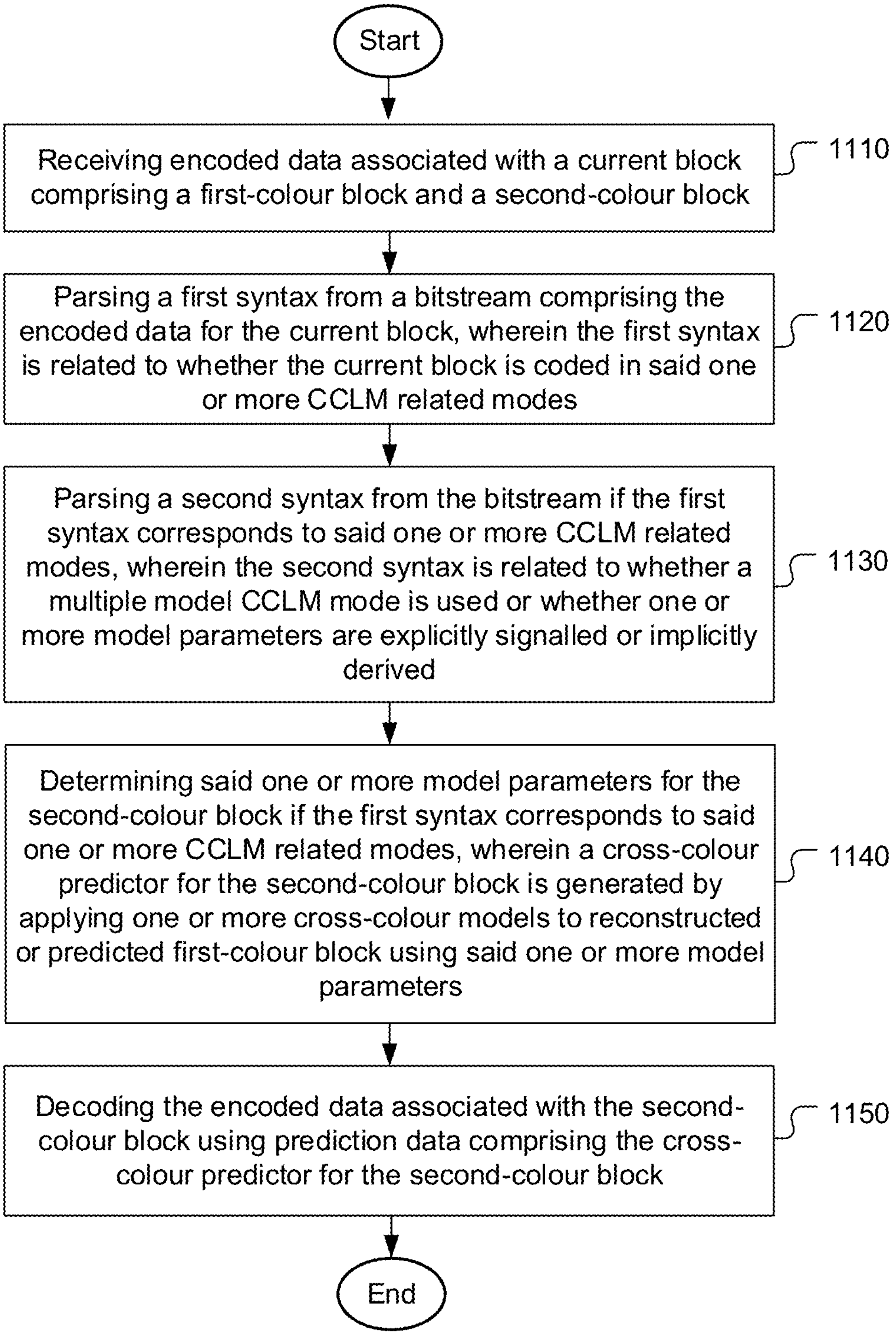
FIG. 11 illustrates a flowchart of an exemplary video decoding system that incorporates a CCLM (Cross-Colour Linear Model) related mode according to an embodiment of the present invention.

FIG. 11 illustrates a flowchart of an exemplary video decoding system that incorporates a CCLM (Cross-Colour Linear Model) related mode according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, encoded data associated with a current block comprising a first-colour block and a second-colour block are received in step 1110. A first syntax is parsed from a bitstream comprising the encoded data for the current block in step 1120, wherein the first syntax is related to whether the current block is coded in said one or more CCLM related modes. A second syntax is parsed from the bitstream if the first syntax indicates the current block being coded in said one or more CCLM related modes in step 1130, wherein the second syntax is related to whether a multiple model CCLM mode is used or whether one or more model parameters are explicitly signalled or implicitly derived. Said one or more model parameters are determined for the second-colour block if the first syntax indicates the current block being coded in said one or more CCLM related modes in step 1140, wherein a cross-colour predictor for the second-colour block is generated by applying one or more cross-colour models to reconstructed or predicted first-colour block using said one or more model parameters. The encoded data associated with the second-colour block are decoded using prediction data comprising the cross-colour predictor for the second-colour block in step 1150.

Figure 12:
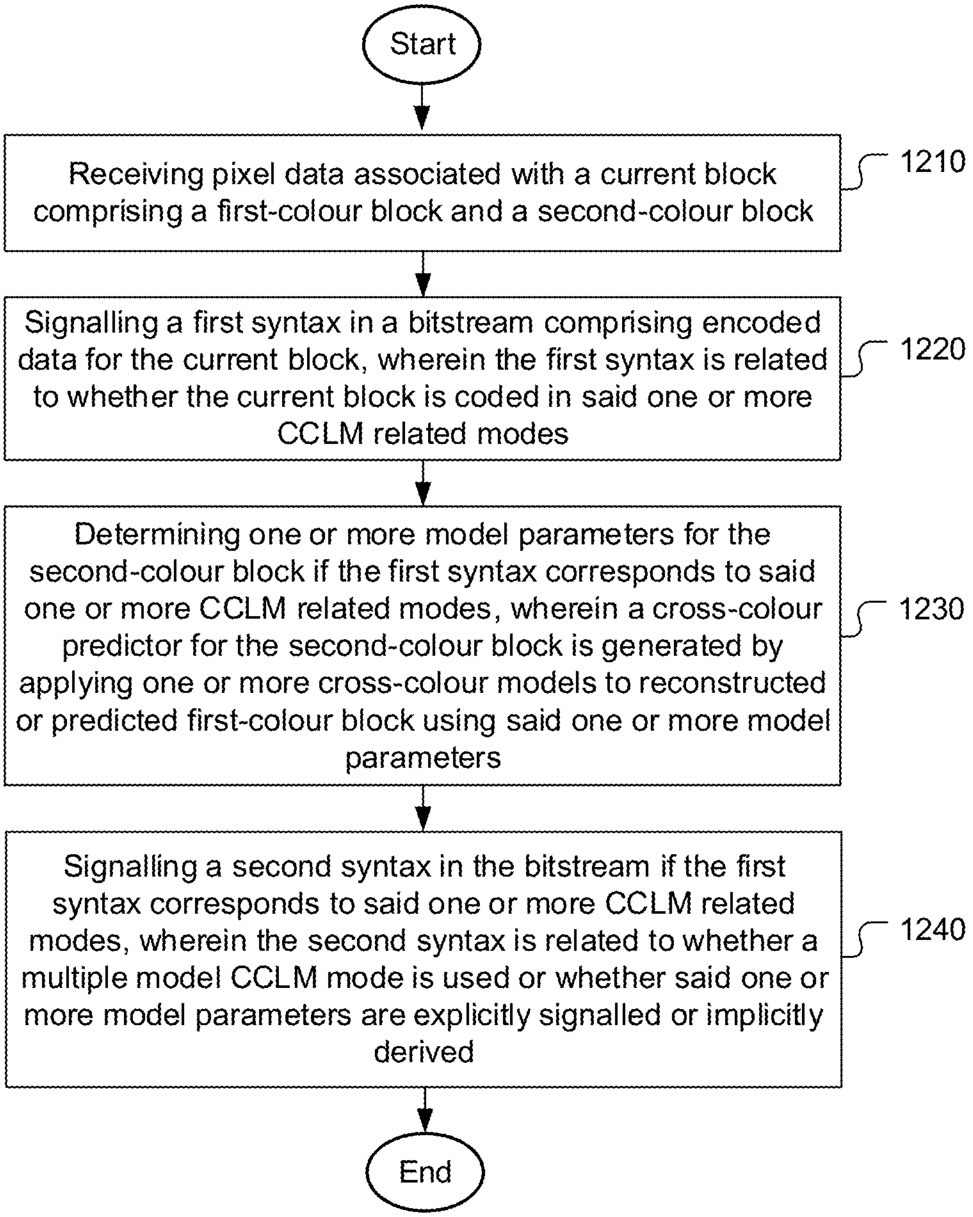
FIG. 12 illustrates a flowchart of an exemplary video encoding system that incorporates a CCLM (Cross-Colour Linear Model) related mode according to an embodiment of the present invention.

FIG. 12 illustrates a flowchart of an exemplary video encoding system that incorporates a CCLM (Cross-Colour Linear Model) related mode according to an embodiment of the present invention. According to this method, pixel data associated with a current block comprising a first-colour block and a second-colour block are received in step 1210. A first syntax is signalled in a bitstream comprising encoded data for the current block in step 1220, wherein the first syntax is related to whether the current block is coded in said one or more CCLM related modes. One or more model parameters for the second-colour block are determined if the first syntax indicates the current block being coded in said one or more CCLM related modes in step 1230, wherein a cross-colour predictor for the second-colour block is generated by applying one or more cross-colour models to reconstructed or predicted first-colour block using said one or more model parameters. A second syntax is signalled in the bitstream if the first syntax indicates the current block being coded in said one or more CCLM related modes in step 1240, wherein the second syntax is related to whether a multiple model CCLM mode is used or whether said one or more model parameters are explicitly signalled or implicitly derived.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding colour pictures using coding tools including one or more CCLM (Cross Colour Linear Model) related modes, the method comprising:

receiving encoded data associated with a current block comprising a first-colour block and a second-colour block;

parsing a first syntax from a bitstream comprising the encoded data for the current block, wherein the first syntax is related to whether the current block is coded in said one or more CCLM related modes;

parsing a second syntax from the bitstream if the first syntax indicates the current block being coded in said one or more CCLM related modes, wherein the second syntax is related to whether a multiple model CCLM mode is used or whether one or more model parameters are explicitly signalled or implicitly derived;

determining said one or more model parameters for the second-colour block if the first syntax indicates the current block being coded in said one or more CCLM related modes, wherein a cross-colour predictor for the second-colour block is generated by applying one or more cross-colour models to reconstructed or predicted first-colour block using said one or more model parameters;

parsing, from the bitstream, a feasible range and/or a step number related to scaling parameters, wherein a flag is derived to indicate whether the feasible range and the step number related to the scaling parameters in a SPS (Sequence Parameter Set) or a PPS (Picture Parameter Set) is overwritten or not; and decoding the encoded data associated with the second-colour block using prediction data comprising the cross-colour predictor for the second-colour block.

2. The method of claim 1, comprising parsing a third syntax from the bitstream if the second syntax is related to whether the multiple model CCLM mode is used, wherein the third syntax is related to whether said one or more model parameters are explicitly signalled or implicitly derived.

3. The method of claim 2, wherein if the third syntax indicates that said one or more model parameters are implicitly derived, an LM_LA mode using both top and left templates is selected for the current block or a further syntax is parsed to indicate a particular CCLM mode among said one or more CCLM related modes for the current block.

4. The method of claim 1, comprising parsing a third syntax from the bitstream if the second syntax is related to whether the multiple model CCLM mode is used, wherein the third syntax indicates a particular CCLM mode among said one or more CCLM related modes.

5. The method of claim 1, comprising parsing a third syntax from the bitstream if the second syntax indicates that said one or more model parameters are explicitly signalled, wherein the third syntax is related to whether the multiple model CCLM mode is used.

6. The method of claim 1, wherein if the second syntax indicates that said one or more model parameters are implicitly derived, an LM_LA mode using both top and left templates is selected for the current block or a further syntax is parsed to indicate a particular CCLM mode among said one or more CCLM related modes for the current block.

7. The method of claim 1, wherein the feasible range and/or the step number related to the scaling parameters are parsed in the SPS, the PPS, an APS (Adaptation Parameter Set), a PH (Picture Header) or a SH (Slice Header) of the bitstream.

8. The method of claim 1, wherein the feasible range comprises an upper-bound and a lower-bound related to the scaling parameters, and the step number is related to a number of steps between the upper-bound and the lower-bound.

9. A method of encoding colour pictures using coding tools including one or more CCLM (Cross Colour Linear Model) related modes, the method comprising:
- receiving pixel data associated with a current block comprising a first-colour block and a second-colour block;
- signalling a first syntax in a bitstream comprising encoded data for the current block, wherein the first syntax is related to whether the current block is coded in said one or more CCLM related modes;
- determining one or more model parameters for the second-colour block if the first syntax indicates the current block being coded in said one or more CCLM related modes, wherein a cross-colour predictor for the second-colour block is generated by applying one or more cross-colour models to reconstructed or predicted first-colour block using said one or more model parameters;
- signalling a second syntax in the bitstream if the first syntax indicates the current block being coded in said one or more CCLM related modes, wherein the second syntax is related to whether a multiple model CCLM mode is used or whether said one or more model parameters are explicitly signalled or implicitly derived; and
- signalling a feasible range and/or a step number related to scaling parameters from the bitstream, wherein a flag is derived to indicate if the feasible range and the step number related to the scaling parameters in a SPS (Sequence Parameter Set) or a PPS (Picture Parameter Set) is overwritten or not.

10. The method of claim 9, comprising parsing a third syntax from the bitstream if the second syntax is related to whether the multiple model CCLM mode is used, wherein the third syntax is related to whether said one or more model parameters are explicitly signalled or implicitly derived.

11. The method of claim 10, wherein if the third syntax indicates that said one or more model parameters are implicitly derived, an LM_LA mode using both top and left templates is selected for the current block or a further syntax is signalled to indicate a particular CCLM mode among said one or more CCLM related modes for the current block.

12. The method of claim 9, comprising signalling a third syntax from the bitstream if the second syntax is related to whether the multiple model CCLM mode is used, wherein the third syntax indicates a particular CCLM mode among said one or more CCLM related modes.

13. The method of claim 9, comprising signalling a third syntax from the bitstream if the second syntax indicates that said one or more model parameters are explicitly signalled, wherein the third syntax is related to whether the multiple model CCLM mode is used.

14. The method of claim 9, wherein if the second syntax indicates that said one or more model parameters are implicitly derived, an LM_LA mode using both top and left templates is selected for the current block or a further syntax is signalled to indicate a particular CCLM mode among said one or more CCLM related modes for the current block.

15. The method of claim 9, wherein the feasible range and/or the step number related to the scaling parameters are signalled in the SPS, the PPS, an APS (Adaptation Parameter Set), a PH (Picture Header) or a SH (Slice Header) of the bitstream.

16. The method of claim 9, wherein the feasible range comprises an upper-bound and a lower-bound related to the scaling parameters, and the step number is related to a number of steps between the upper-bound and the lower-bound.

17. An apparatus for decoding colour pictures using coding tools including one or more CCLM (Cross Colour Linear Model) related modes, the apparatus comprising one or more electronics or processors arranged to:
- receive encoded data associated with a current block comprising a first-colour block and a second-colour block;
- parse a first syntax from a bitstream comprising the encoded data for the current block, wherein the first syntax is related to whether the current block is coded in said one or more CCLM related modes;
- parse a second syntax from the bitstream if the first syntax indicates the current block being coded in said one or more CCLM related modes, wherein the second syntax is related to whether a multiple model CCLM mode is used or whether one or more model parameters are explicitly signalled or implicitly derived;
- determine said one or more model parameters for the second-colour block if the first syntax indicates the current block being coded in said one or more CCLM related modes, wherein a cross-colour predictor for the second-colour block is generated by applying one or more cross-colour models to reconstructed or predicted first-colour block using said one or more model parameters;
- parse, from the bitstream, a feasible range and/or a step number related to scaling parameters, wherein a flag is derived to indicate whether the feasible range and the step number related to the scaling parameters in a SPS (Sequence Parameter Set) or a PPS (Picture Parameter Set) is overwritten or not; and
- decode the encoded data associated with the second-colour block using prediction data comprising the cross-colour predictor for the second-colour block.

18. An apparatus for encoding colour pictures using coding tools including one or more CCLM (Cross Colour Linear Model) related modes, the apparatus comprising one or more electronics or processors arranged to:
- receive pixel data associated with a current block comprising a first-colour block and a second-colour block;
- signal a first syntax in a bitstream comprising encoded data for the current block, wherein the first syntax is related to whether the current block is coded in said one or more CCLM related modes;
- determine one or more model parameters for the second-colour block if the first syntax indicates the current block being coded in said one or more CCLM related modes, wherein a cross-colour predictor for the second-colour block is generated by applying one or more cross-colour models to reconstructed or predicted first-colour block using said one or more model parameters;

signal a second syntax in the bitstream if the first syntax indicates the current block being coded in said one or more CCLM related modes, wherein the second syntax is related to whether a multiple model CCLM mode is used or whether said one or more model parameters are explicitly signalled or implicitly derived; and signal a feasible range and/or a step number related to scaling parameters from the bitstream, wherein a flag is derived to indicate if the feasible range and the step number related to the scaling parameters in a SPS (Sequence Parameter Set) or a PPS Picture Parameter Set) is overwritten or not.

* * * * *